United States Patent [19]
Schwartz, Jr. et al.

[11] 3,835,199
[45] Sept. 10, 1974

[54] DEHYDROGENATION PROCESS AND CATALYST

[75] Inventors: Andrew K. Schwartz, Jr., Houston; Tony Rabago, Jr., Pearland, both of Tex.

[73] Assignee: Petro-Tex Chemical Corporation, Houston, Tex.

[22] Filed: Apr. 24, 1972

[21] Appl. No.: 246,683

[52] U.S. Cl............ 260/683.3, 252/416, 260/680 R
[51] Int. Cl............................................... C07c 3/28
[58] Field of Search......... 260/683.3, 680 R, 680 E; 252/416

[56] References Cited
UNITED STATES PATENTS

| | | | |
|---|---|---|---|
| 2,546,031 | 3/1951 | Hanson | 260/680 |
| 3,267,025 | 8/1966 | Gring et al. | 208/136 |
| 3,403,192 | 9/1968 | Vadekar et al. | 260/680 E |
| 3,585,250 | 6/1971 | Pasternak et al. | 260/683.3 |
| 3,665,049 | 5/1972 | Cornelius | 260/683.3 |

*Primary Examiner*—Delbert E. Gantz
*Assistant Examiner*—Juanita M. Nelson
*Attorney, Agent, or Firm*—N. Elton Dry

[57] ABSTRACT

An improved dehydrogenation process for the production of diolefins by the dehydrogenation of aliphatic hydrocarbons by contacting the hydrocarbon compound with a catalyst containing chromic oxide, alumina, and a sulfur containing compound such as sulfuric acid and sulfates of zinc magnesium and cobalt.

7 Claims, No Drawings

DEHYDROGENATION PROCESS AND CATALYST

BACKGROUND OF THE INVENTION

1. Field of the Invention

This application relates to the dehydrogenation of aliphatic organic compounds for the production of olefins and diolefins. More particularly, this application relates to improved catalytic compositions useful in the preparation of butadiene and butenes from n-butane, propylene from propane, isobutene from isobutane and isoamylenes and isoprene from isopentane by catalytic dehydrogenation.

2. Description of the Prior Art

Organic compounds are commercially dehydrogenated by contacting the compound to be dehydrogenated at an elevated temperature preferably in the presence of catalysts. A particularly useful catalyst which has been widely employed in preparing butadiene and butylenes from n-butane is an aluminachromia catalyst. The alumina-chromic oxide catalyst is utilized in a commercial process for the one-step dehydrogenation of butane to butadiene and butenes. This process has been reported to produce only about 11 mol percent butadiene per pass. Furthermore, the catalyst becomes coated with coke and after a period of only several minutes, the catalyst must be regenerated by purging the catalyst bed followed by burning off of the carbon.

In an article entitled, "Butane Dehydrogenation at Billingham," in Chemistry and Industry, Aug. 10, 1953, pp. 550-556, it was reported that excessive buildup of carbon in the alumina-chromia catalyst bed could be mitigated by doping the butane fed to the catalyst bed with from 30-40 ppm of carbon disulfide. It was further reported in Proceedings of the National Institute of Sciences of India, volume 12, pages 97-102 (1946), that in the dehydrogenation of butene-1 over an alumina-chromia, the catalyst could be somewhat promoted in its activity by the addition of small amounts of sulfur thereto. However, the dehydrogenation products from the sulfur modified catalyst contained detrimental amounts of hydrogen sulfide.

SUMMARY OF THE INVENTION

According to the present invention organic, aliphatic compounds are dehydrogenated by an improved process utilizing a catalyst comprising alumina, chromium oxide and a sulfur containing compound. It has been found, quite unexpectedly that when a minor amount of a sulfur containing compound such as sulfuric acid, zinc sulfate, magnesium sulfate and cobalt sulfate are incorporated into the alumina-chromium oxide catalyst, the resulting catalyst composition demonstrates significant improvements in yield of dehydrogenated products. For example, the prior art dehydrogenation of n-butane to butenes and butadiene using chromia-alumina catalyst is quite satisfactory with respect to selectivity of the products produced, however, conversion usually falls significantly short of the thermodynamically possible equilibrium conversions. The present invention provides a catalyst having a significant and unexpected increase in activity which results in improved and significant increase in yield of the desired dehydrogenation products per pass in comparison to the yields obtained with the conventional chromia-alumina catalysts. Further, the selectivity of the chromia-alumina catalyst of the present invention is unexpectedly improved with respect to conventional chromia-alumina catalysts. For instance, yields of butenes and butadiene from n-butane using a commercial chromia-alumina catalyst (Harshaw) to which has had added thereto small amounts of sulfuric acid were some 4.6 percent per pass greater than the corresponding yields obtained by using the commercial catalyst (Harshaw) without the added sulfuric acid.

DESCRIPTION OF THE PREFERRED EMBODIMENTS

According to this invention an improved catalyst and a process utilizing the improved catalyst are provided for the dehydrogenation of aliphatic organic compounds to obtain the corresponding unsaturated derivatives thereof.

The process of this invention may be applied to the dehydrogenation of a variety of organic compounds having at least 2 carbon atoms to obtain the corresponding unsaturated derivative thereof. Such compounds normally will contain from 2 to 20 carbon atoms, at least one

grouping, a boiling point below about 350°C., and such compounds may contain other elements in addition to carbon and hydrogen such as oxygen, halogen, nitrogen and sulphur. Preferred are compounds having from 2 to 12 carbon atoms and especially preferred are compounds of 4 and 5 carbon atoms.

Among the types of organic compounds to be dehydrogenated to the corresponding unsaturated derivative by means of the process of this invention are nitriles, alkyl halides, aldehydes, alcohols, cycloalkanes, alkanes, alkenes, and the like. Illustrative dehydrogenations include propionitrile to acrylonitrile, propionaldehyde to acrolein, ethyl chloride to vinyl chloride, methyl isobutyrate to methyl methacrylate, ethane to ethylene, propane to propylene, isobutane to isobutylene, n-butane to butene and butadiene-1,3, methyl butene to isoprene, cyclopentane to cyclopentene and cyclopentadiene-1,3, and the like.

The preferred feed to be dehydrogenated comprises hydrocarbons of 4 to 5 carbon atoms and particularly n-butane, butene-1, butene-2, pentane, pentene-1, pentene-2, 2-methylbutane, 2-methylbutene-1, 2-methylbutene-2, 3-methylbutene-1, 2-methylpentane, 2-methylpentene-1 and mixtures thereof. The preferred products are butadiene-1,3 and isoprene.

Diluents or stripping agents such as nitrogen, helium, or other gases may be fed to the process at any point. Mixtures of diluents may be employed. Volatile compounds which are not dehydrogenated or which are dehydrogenated only to a limited extent may also be present as diluents.

The temperature during the dehydrogenation generally will be at least about 450°C, such as within the range of about 500°C to about 650°C or 700°C. Preferably the temperatures are within the range of about 500°C and 600°C. The total pressure during dehydrogenation may be atmospheric, super atmospheric or sub atmospheric. The contact time of the organic compound during dehydrogenation may also vary widely depending upon the particular conditions employed. Determination of the optimum contact time under the particular conditions so chosen from the ranges of conditions mentioned herein is well within the skill of any artisan in this art. The flow rates will be within the range of about 0.1 to 10 liquid volumes of the organic compound to be dehydrogenated per volume of dehydrogenation zone containing catalyst per hour (referred to as LHSV). Usually, the LHSV will be between 0.15 and about 5. For calculation, the volume of a fixed bed dehydrogenation zone containing catalyst is that original void volume of reactor space containing catalyst.

The catalyst of the present invention contains activated alumina, chromium oxide and a sulfur containing compound. A preferred catalyst comprises a minor portion of chromium oxide and a sulfur containing compound such as sulfuric acid, cobalt sulfate, magnesium sulfate and zinc sulfate with a major proportion of activated alumina such as gamma or eta alumina. The catalyst generally will contain as active catalyst components from one to forty percent chromium oxide, one to fifteen percent sulfur containing compound with the remainder being the activated alumina. A particularly preferred catalyst of the present invention contains as active ingredients from 18 to 20 percent chromium oxide, 3 to 10 percent sulfur containing compound with the remainder being gamma or eta alumina. The above percentages are based on the weight of active components in the catalyst, i.e., percent by weight of total chromium compounds, sulfur compounds and activated alumina. Carriers or supports for the active catalyst components may be employed such as pumice, silica, alpha alumina, etc. In addition, inert granular material of high heat capacity may be mixed with the active catalyst components in predetermined amounts to obtain any desired heat capacity of the complete catalyst bed. The selection of such an inert granular material and the ratio of granular inert material to the active catalyst components are well within the skill of an artisan in the catalytic dehydrogenation art.

The catalyst compositions of the present invention contain the essential ingredients of activated alumina, chromic oxide and a sulfur containing compound such as sulfuric acid, cobalt sulfate, magnesium sulfate and zinc sulfate. These essential ingredients can be made by mixing the separate ingredients by any of the methods known to those skilled in the art. For example, the alumina may be treated with a salt of chromium and the resulting mixture heated to decompose the salt and deposit chromium oxide on the alumina. The sulfur containing compound can be added to the alumina-chromia component before or after the deposition of the chromium oxide on the alumina and the resulting mixture pelleted and dried, if necessary. A simple manner of preparing the catalyst of the present invention is to prepare a slurry of a commercially available chromia-alumina catalyst such as that available under the trade name of Houdry C or Harshaw Cr0211 and adding the sulfur containing compound thereto. The mixture is then pelleted and dried if necessary.

The alumina may be any of the known forms of alumina, although preferably it is an activated alumina such as gamma and eta alumina, so that a chromium oxide layer is readily deposited thereon. The alumina-chromia dehydrogenation catalyst can also be prepared treating activated alumina with a solution of chromic acid and after drying, heating the treated activated alumina at temperatures of about 600°C. Examples of the preparation of such catalyst materials are found in U.S. Pat. Nos. 2,399,678 and 2,419,997, the entire contents of which are incorporated herein by reference.

The invention will be further illustrated by the following examples. Percent conversion refers to the moles of organic compound to be dehydrogenated, that is, the number of moles or organic compound consumed, based on the moles of the organic compound being fed to the reactor. Percent selectivity refers to the moles of product formed based on the moles of organic compound consumed. Percent yield refers to the product formed based on the moles of organic compound fed to the reactor. All other percentages are by weight unless expressed otherwise.

EXAMPLES 1–3

The invention is illustrated in these examples by the dehydrogenation of n-butane to butenes and butadiene. In each example, the n-butane was passed through a catalyst bed comprising a standard alumina-chromia catalyst, obtained commercially under the trade name Houdry C or Harshaw Cr0211, to which had been added a specific weight percent of a sulfur containing compound. The catalyst composition of Examples 1 and 2 contained 3 weight percent and 5 weight percent $ZnSO_4 \cdot 7H_2O$ respectively. The catalyst composition of Example 3 contained 5 percent by weight of $H_2SO_4$. The catalysts were prepared by mixing the commercially available alumina-chromia catalyst material (Houdry C or Harshaw Cr0211) with the $ZnSO_4 \cdot 7H_2O$ and $H_2SO_4$ respectively as a slurry in demineralized water. The mixed catalyst was extruded into pellets of about ⅛ inch in size and the pellets were then dried in an oven at less than 300°F. The catalyst could be calcined if desired, however, this is not necessary.

The n-butane gas consisting almost essentially of n-butane with trace amounts of isobutane and butenes was passed through the catalyst bed at a temperature of approximately 550°C a pressure of 22 inches mercury vacuum and at a space velocity of 1.25 LHSV. The process of these examples was conducted in a cyclic fashion wherein the n-butane was fed to the reactor for a specified time period, the reactor was then purged with nitrogen and then regenerated by passing air through the catalyst bed. The cycle was then repeated. The total time for a single cycle is as follows:

9 minutes feed of n-butane to the catalyst bed,
1 minute nitrogen purge of the catalyst bed,
9 minutes feed of air to the catalyst bed.

The results obtained after the specified number of hours of cyclic operation of Examples 1 and 2 are shown in Table I.

TABLE I

| Example | Catalyst | Total Hours Operation | Conversion of n-Butane | | Selectivity to Butene Production | | Selectivity to Butadiene Production | | Yield of Butene and Butadiene | |
|---|---|---|---|---|---|---|---|---|---|---|
| 1 | Houdry C plus 3 weight percent ZnSO$_4$·7H$_2$O | 89<br>112<br>136 | 46.2<br>45.3<br>44.8 | mole %<br>do.<br>do. | 84.4<br>85.3<br>86.2 | mole %<br>do.<br>do. | 11.3<br>10.1<br>10.1 | mole %<br>do.<br>do. | 44.2<br>43.2<br>43.1 | mole %<br>do.<br>do. |
| 2 | Houdry C plus 5 weight percent ZnSO$_4$·7H$_2$O | 71.5<br>90.5<br>117.5<br>138.5<br>162.0 | 46.3<br>45.9<br>48.1<br>47.2<br>44.1 | mole %<br>do.<br>do.<br>do.<br>do. | 85.8<br>85.0<br>84.8<br>86.6<br>87.5 | mole %<br>do.<br>do.<br>do.<br>do. | 8.8<br>9.9<br>10.9<br>9.6<br>8.4 | mole %<br>do.<br>do.<br>do.<br>do. | 43.8<br>43.5<br>46.0<br>45.4<br>42.3 | mole %<br>do.<br>do.<br>do.<br>do. |
| 3 | Houdry C plus 10 weight percent ZnSO$_4$·7H$_2$O | 90.0<br>121.0<br>138.5 | 42.9<br>40.0<br>40.3 | mole %<br>do.<br>do. | 86.6<br>86.1<br>85.1 | mole %<br>do.<br>do. | 9.8<br>10.7<br>11.0 | mole %<br>do.<br>do. | 41.3<br>38.7<br>38.7 | mole %<br>do.<br>do. |

EXAMPLES 4–6

The dehydrogenation process of Examples 1-3 was repeated with the sole exception that the alumina-chromia component of the catalyst consisted entirely of chromia-alumina catalyst obtained commercially under the trade name Harshaw Cr0211. The results obtained in these examples are shown in Table II.

TABLE II

| Example | Catalyst | Total Hours Operation | Conversion of n-Butane | | Selectivity to Butene Production | | Selectivity to Butadiene Production | | Yield of Butene and Butadiene | |
|---|---|---|---|---|---|---|---|---|---|---|
| 4 | Harshaw Cr0211 plus 5 weight percent ZnSO$_4$·7H$_2$O | 5.0<br>18.0<br>89.0<br>112.0<br>136.0 | 21.1<br>35.6<br>43.2<br>41.3<br>40.4 | mole %<br>do.<br>do.<br>do.<br>do. | 76.1<br>80.9<br>82.3<br>84.1<br>84.2 | mole %<br>do.<br>do.<br>do.<br>do. | 11.7<br>11.7<br>11.1<br>10.7<br>10.4 | mole %<br>do.<br>do.<br>do.<br>do. | 18.6<br>33<br>40.3<br>39.2<br>38.2 | mole %<br>do.<br>do.<br>do.<br>do. |
| 5 | Harshaw Cr0211 plus 5 weight percent MgSO$_4$·7H$_2$O | 66.0<br>89.5<br>113.5<br>137.5 | 46.3<br>45.9<br>42.7<br>43.4 | mole %<br>do.<br>do.<br>do. | 83.4<br>85.2<br>83.9<br>85.3 | mole %<br>do.<br>do.<br>do. | 9.9<br>9.6<br>11.4<br>9.4 | mole %<br>do.<br>do.<br>do. | 43.2<br>43.5<br>40.8<br>41.1 | mole %<br>do.<br>do.<br>do. |
| 6 | Harshaw Cr0211 plus 5 weight percent H$_2$SO$_4$ | 3.5<br>71.5<br>90.5<br>117.5<br>138.5<br>163.0 | 40.3<br>45.3<br>48.3<br>43.8<br>45.9<br>42.7 | mole %<br>do.<br>do.<br>do.<br>do.<br>do. | 85.3<br>86.4<br>87.3<br>84.7<br>84.7<br>85.6 | mole %<br>do.<br>do.<br>do.<br>do.<br>do. | 8.4<br>8.0<br>9.6<br>9.4<br>10.0<br>9.6 | mole %<br>do.<br>do.<br>do.<br>do.<br>do. | 37.7<br>42.8<br>46.7<br>41.2<br>43.4<br>40.6 | mole %<br>do.<br>do.<br>do.<br>do.<br>do. |

COMPARISON EXAMPLES 7–8

For comparison purposes, the dehydrogenation process of Examples 1-3 and 4-6 were repeated with the sole exception that the catalyst used in Example 7 consisted entirely of the chromia-alumina catalyst commercially obtained under the trade name Houdry C and the catalyst used in Example 8 consisted entirely of the catalyst obtained under the trade name Harshaw Cr0211. The results obtained in these examples are shown in Table III. The Houdry C and Harshaw Cr0211 catalysts were subjected to the slurry treatment in demineralized water as detailed in the description of Examples 1-3, however, no other component was added to the slurry.

TABLE III

| Example | Catalyst | Total Hours Operation | Conversion of n-Butane | | Selectivity to Butene Production | | Selectivity to Butadiene Production | | Yield of Butene and Butadiene | |
|---|---|---|---|---|---|---|---|---|---|---|
| 7 | Houdry C | 23.5<br>52.5<br>118.5<br>142.5<br>167.5 | 49.4<br>46.9<br>44.8<br>42.3<br>42.9 | mole %<br>do.<br>do.<br>do.<br>do. | 85<br>85.7<br>85<br>85.2<br>83.7 | mole %<br>do.<br>do.<br>do.<br>do. | 9.6<br>10.4<br>10.8<br>10.7<br>11.7 | mole %<br>do.<br>do.<br>do.<br>do. | 44.8<br>45.1<br>42.8<br>40.1<br>40.9 | mole %<br>do.<br>do.<br>do.<br>do. |
| 8 | Harshaw Cr0211 | 4.5<br>23.5<br>52.5<br>118.5<br>142.5<br>167.5 | 44.6<br>42.3<br>41.7<br>41.4<br>41.6<br>38.8 | mole %<br>do.<br>do.<br>do.<br>do.<br>do. | 82.4<br>84.1<br>83.6<br>84.9<br>84.9<br>84.2 | mole %.<br>do.<br>do.<br>do.<br>do.<br>do. | 10.2<br>10.5<br>10.4<br>9.7<br>9.8<br>10.4 | mole %<br>do.<br>do.<br>do.<br>do.<br>do. | 41.2<br>40.0<br>39.2<br>39.2<br>39.4<br>36.7 | mole %<br>do.<br>do.<br>do.<br>do.<br>do. |

We claim:

1. A process for the catalytic dehydrogenation of organic compounds having from 2 to 20 carbon atoms and at least one

grouping by a cyclic process wherein the catalyst is periodically regenerated by oxidation which comprises contacting said organic compound in a dehydrogenation step at a temperature of from about 450° to about 700°C. with a catalyst which comprises an intimate mixture of active catalyst components consisting essentially of from 1 percent to 40 percent by weight chromium oxide, 1 percent to 15 percent of a sulfur containing compound selected from the group consisting of metal sulfates, sulfuric acid and mixtures thereof with the remainder being essentially alumina.

2. A process according to claim 1 wherein the alumina is gamma alumina, eta alumina or a mixture thereof.

3. A process according to claim 1 wherein the organic compound has between 2 and 12 carbon atoms.

4. A process according to claim 1 wherein the organic compound has 4 or 5 carbon atoms.

5. A process according to claim 1 wherein the organic compound is essentially n-butane.

6. A process according to claim 1 wherein the temperature is between 500°C and 600°C and the active catalyst consists of from 18 percent to 20 percent by weight chromium oxide, 3 percent to 10 percent of a sulfur containing compound consisting of metal sulfates, sulfuric acid and mixture thereof with the remainder being essentially alumina.

7. A process according to claim 1 wherein the sulfur containing compound is selected from the group consisting of sulfuric acid, zinc sulfate, cobalt sulfate, magnesium sulfate and mixtures thereof.

* * * * *